United States Patent [19]

Daouse

[11] Patent Number: 5,135,767
[45] Date of Patent: Aug. 4, 1992

[54] PROCESS AND APPARATUS FOR THE PRODUCTION OF AN ARTICLE OF ICE CONFECTIONERY

[75] Inventor: Alain Daouse, Noailles, France

[73] Assignee: Nestec S.A., Vevey, Switzerland

[21] Appl. No.: 622,813

[22] Filed: Dec. 4, 1990

[30] Foreign Application Priority Data

Dec. 27, 1989 [EP] European Pat. Off. ........ 89123929.5

[51] Int. Cl.⁵ .......................... A23G 9/00; A23P 1/00
[52] U.S. Cl. .................... 426/515; 99/450.1;
425/91; 425/92; 426/139; 426/516
[58] Field of Search ............... 426/139, 515, 658, 516;
425/91, 92, 96, 99, 118, 376.1, 574, 575;
99/450.1; 222/135; 239/227, 264

[56] References Cited

U.S. PATENT DOCUMENTS 4,477,473 10/1984 Schoonmaker et al. ............ 426/515

FOREIGN PATENT DOCUMENTS

0221757 5/1987 European Pat. Off. .
0322469 5/1989 European Pat. Off. .
1076117 7/1967 United Kingdom .

Primary Examiner—George Yeung
Attorney, Agent, or Firm—Vogt & O'Donnell

[57] ABSTRACT

To make an article of ice confectionery having a flaky texture, superposed ribbons of ice confectionery and a crispy composition are extruded into a mold in the form of a body of revolution by means of an extrusion assembly comprising a flat extrusion tube and a spray tube. The support of the extrusion assembly receives a spinning movement resulting from a continuous horizontal rotational movement and an ascending and descending movement relative to the mold.

16 Claims, 5 Drawing Sheets

PROCESS AND APPARATUS FOR THE PRODUCTION OF AN ARTICLE OF ICE CONFECTIONERY

BACKGROUND OF THE INVENTION

This invention relates to a process and an apparatus for the production of an article of ice confectionery containing flakes of crispy composition within its mass.

In the field of articles of ice confectionery in the form of individual portions, such as stick ices, ice lollies, cones, rolls, tubs and the like, there are articles containing flakes of chocolate distributed within the ice cream mass.

With a view to producing new textures, consumers have been offered articles of ice confectionery which contain thin layers of crispy material to provide them with a flaky texture.

Thus, according to EP 322 469, such articles as flaky stick ices or cones are produced by successive formation of layers of ice cream and thin layers of chocolate by partial freezing of the ice cream at its periphery, removal of the central, still liquid part under suction, spraying of chocolate into the cavity thus formed and filling of the central part with ice cream. Because of production constraints, the articles obtained contain only a relatively small number of thin, crispy, longitudinal layers continuous in revolution.

According to EP 221 757, ice cream cones or stick ices containing thin chocolate chips are produced by forming longidutinal grooves in an extruded strand of ice cream by means of deflectors and filling the grooves thus formed with chocolate, the veins of chocolate, which solidify on contact with the ice cream, breaking randomly into chips when the strand is folded double to fill the mould. The texture obtained is not the same as that which would be obtained if the thin layers of chocolate were to form substantially continuous flakes. It has in effect been found that it was a really pleasant sensation to chew through thin, contrasting and clearly discernible layers of soft material and crispy material.

SUMMARY OF THE INVENTION

The object of the invention is to provide an article of ice confectionery of the above-mentioned type which contains a large quantity of flakes of crispy composition arranged transversely in the form of substantially continuous ribbons.

The process according to the invention comprises the following steps:

lowering into a mould in the form of a body of revolution an extrusion assembly comprising a flat nozzle for extruding ice confectionery, of which the nozzle outlet is substantially horizontal, and a nozzle for spraying a crispy composition, of which the nozzle outlet is substantially parallel to that of the extrusion nozzle, said nozzles being integral with one another and arranged in such a way that the extrusion nozzle outlet is situated in the vicinity of the spray nozzle outlet, the extrusion assembly being offset in relation to the axis of the mould and being continuously rotated so that it always keeps the same orientation in space, and extruding superposed ribbons of ice confectionery and crispy composition from the tubes while an upwardly directed movement is imparted to the extrusion assembly so that the result of the movements is a spinning movement.

The process according to the invention is particularly, but not exclusively, intended for the production of ice cream cones. In this preferred case, the mould is formed by a cornet wafer, preferably coated internally with a thin layer of a fat-based material acting as a moisture barrier. To make articles of this type, the wafers are placed in holes formed in plates fixed to a chain. The chain advances step-by-step. The wafer cones are thus presented to the filling unit and preferably remain stationary during filling. After filling, they pass through a tunnel of cold air in which their contents harden.

In one advantageous embodiment of the process, which enables the filling rate to be increased, the descending movement may be divided into two translatory movements, first rapid and then slow, while the ascending movement may be divided into two movements, first slow during filling and then rapid on completion of filling.

In a variant of the process, a device, for example a permanently rotating ring, placed beneath the chain lifts the cones so that they surround the extrusion assembly and imparts a downward spinning movement to them during the extrusion process, the extrusion assembly remaining stationary.

In another variant of the process, a device of the type mentioned above is only raised and lowered while the extrusion assembly is horizontally rotated, i.e., is not vertically displaced. Finally, in a last variant, the extrusion assembly makes only a descending and ascending movement while the device supporting the cones is horizontally rotated.

It can be seen that, irrespective of the variant selected, the resultant relative movement of the extrusion assembly and the mould corresponds to a spinning movement in which the extrusion assembly moves away from the mould during the filling process.

The present invention also relates to an apparatus for the production of an article of ice confectionery containing flakes of crispy composition within its mass, characterized in that it comprises:

a mould in the form of a body of revolution which is designed to receive the ice confectionery, a support arranged in such a way that it always keeps the same orientation in space, an extrusion assembly which is fixed to the support and offset in relation to the axis of the mould, comprising a flat tube for extruding ice confectionery, of which the nozzle is substantially horizontal, and a tube for spraying a crispy composition, of which the nozzle is substantially parallel to that of the extrusion tube, said tubes being integral with one another and arranged in such a way that the extrusion nozzle is situated in the vicinity of the spray nozzle, means for continuously rotating the support horizontally relative to the mould, and means for imparting an alternating vertical movement to the support relative to the mould.

The invention is described in more detail with reference to the accompanying drawings.

DETAILED DESCRIPTION OF THE DRAWINGS

Figure 1:
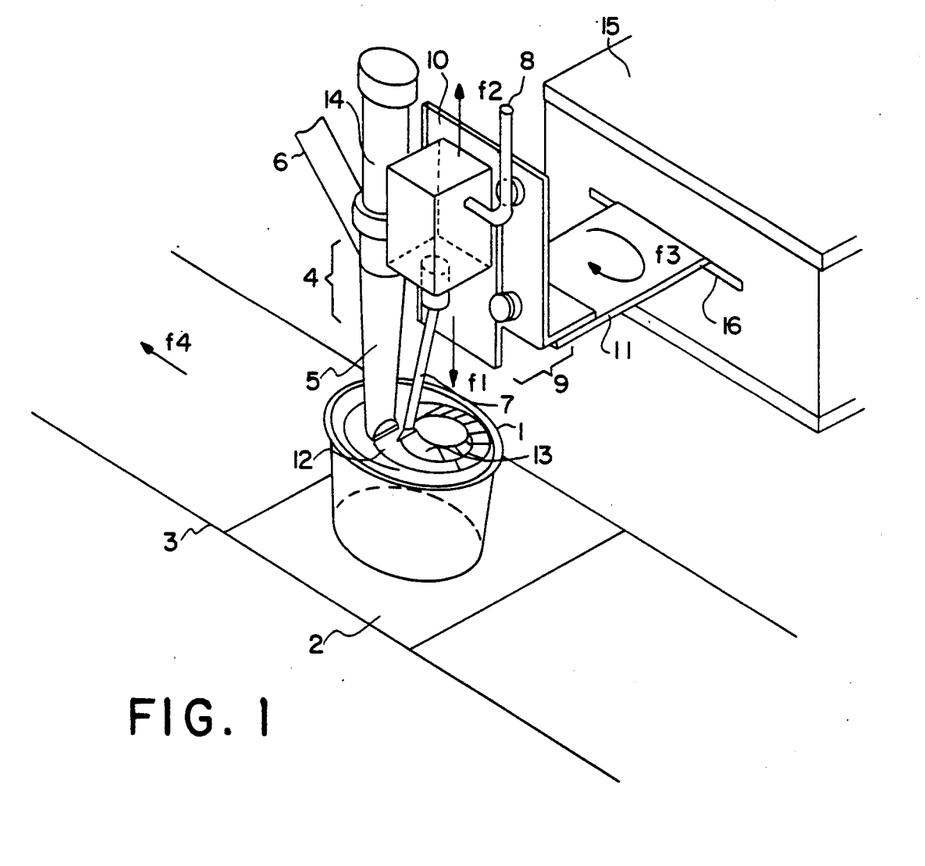
FIG. 1 schematically illustrates the apparatus during the filling step.

Referring to FIG. 1, a wafer cornet 1 already coated internally with a layer of chocolate is carried by a plate 2 formed with a hole to receive the cone. The plate 2 is fixed to an endless chain 3 and stops beneath the extrusion assembly 4, the stopping time of the chain corresponding to the time required for the filling. The extrusion assembly 4 consists of an extrusion tube 5 fed with ice cream 6 and a tube 7 for spraying chocolate which is fed with chocolate at 8. The extrusion assembly is fixed to a support 9 comprising a vertical runner 10, which enables it to move up and down, and a horizontal plate 11 to which a continuous rotating movement is imparted. The ascending and descending movement of the support indicated by the arrows f1, f2 will be explained in more detail hereinafter with reference to FIGS. 3 and 4.

The rotational movement of the support indicated by the arrow f3 will be explained in more detail hereinafter with reference to FIG. 2.

The extrusion assembly is offset in relation to the axis of the cornet. The amplitude of the rotational movement of the extrusion assembly and the width of the flat tubes are slightly smaller than the mean radius of the cornets. In this way, the tubes sweep the mean crosssection of the cornet to ensure good coverage of the layers.

For filling, the extrusion assembly 4 descends while rotating into the cornet 1 to approximately half its length, after which the ice cream 12 and the chocolate 13 are simultaneously extruded in the form of superposed ribbons while the extrusion assembly ascends in a which result spinning movement.

When the cornet has been filled, the supplies of ice cream and chocolate are simultaneously interrupted. The supply of ice cream is interrupted through a piston valve (not shown) actuated by the pneumatic jack 14. In this way, the formation of drops between successive filling cycles is avoided.

So far as the chocolate is concerned, the spray nozzle is associated with a spray gun for spraying viscous liquid products of the so-called "low pressure" type, for example of the order of 0.5 to 1 bar in relation to atmospheric pressure.

The supply of chocolate is interrupted by a flap (not shown) controlled by a magnetic end-of-stroke detector (not shown) for the piston of the jack 14.

In one advantageous embodiment which enables the filling rate to be increased, the extrusion assembly is designed to descend first rapidly from its highest position and then more slowly once the cornet has arrived in its filling position. The cornet can be filled by a slow ascending movement of the extrusion assembly and then, on completion of filling, by a rapid ascending movement to separate the extrusion assembly from the filled cornet. The descending and ascending movements may thus each be divided into two sequences taking place at different speeds.

After the extrusion assembly has been separated from the cornet, the chain 3 can advance by a distance of one plate in the direction of the arrow f4 under the power of a stepping motor (not shown) and thus presents another cornet for filling. The sequence of operations described above can then begin again.

Figure 2:
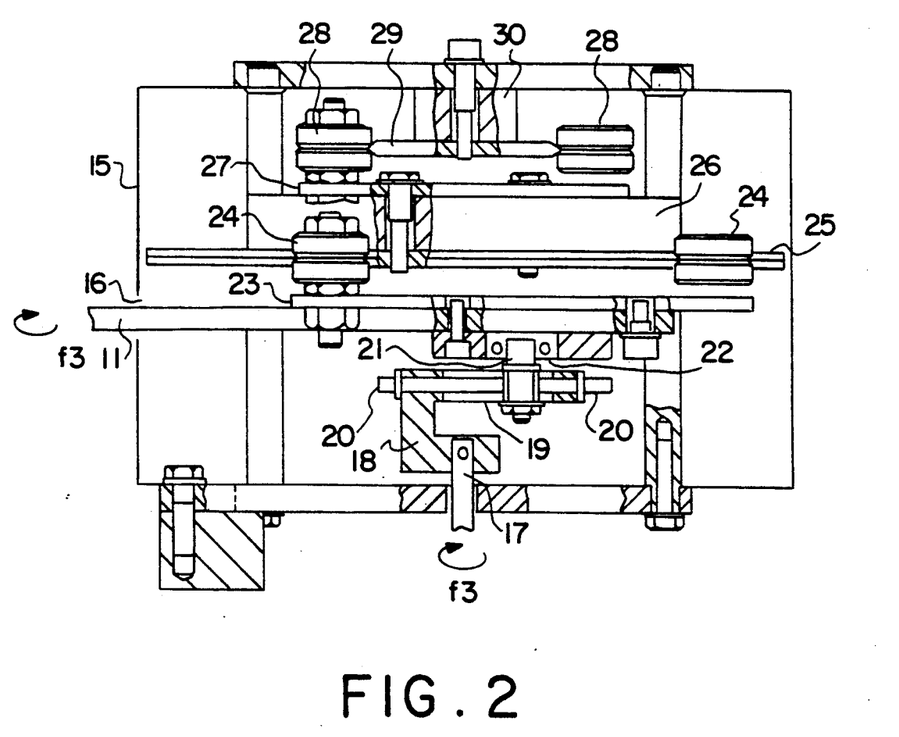
FIG. 2 is a view, partly in section, through the means for rotating the support.

Referring to FIGS. 1 and 2, the drive mechanism for rotating the support 9 is accommodated in a housing 15 and is supported by a frame carrying a motor (not shown). A slot 16 is formed in the housing 15 for the plate 11 to pass through.

The motor permanently drives the shaft 17. Fixed to the shaft 17 is a crank 18 of which the lever 19 is adjustable by screws 20 that bear against the pin 21 which, before tightening of the screws 20, is able to slide along a slot formed in the arm of the lever.

The pin 21 engages in the pedestal 22 mounted on ball bearings and forms the pivot hole of the crank. The pedestal 22 is fixed to the plate 11 itself integral with the plate 23 which carries a first set of four rollers 24. The rollers 24 are designed to run freely along the runner 25 which enables the plate 11 to be laterally displaced. Secured to the runner 25 is a distance block 26 to which is fixed a plate 27 carrying a second set of rollers 28. The rollers 28 are designed to run freely along the runner 29 which is fixed to the housing 15 through the distance block 30. The fixed runner 29 is perpendicular to the mobile runner 25 which enables the plate 11 to be longitudinally displaced.

It is clear that the extrusion assembly always keeps the same orientation in space by virtue of the fact that each point of the plate 11 describes a horizontal circle.

Figure 3:
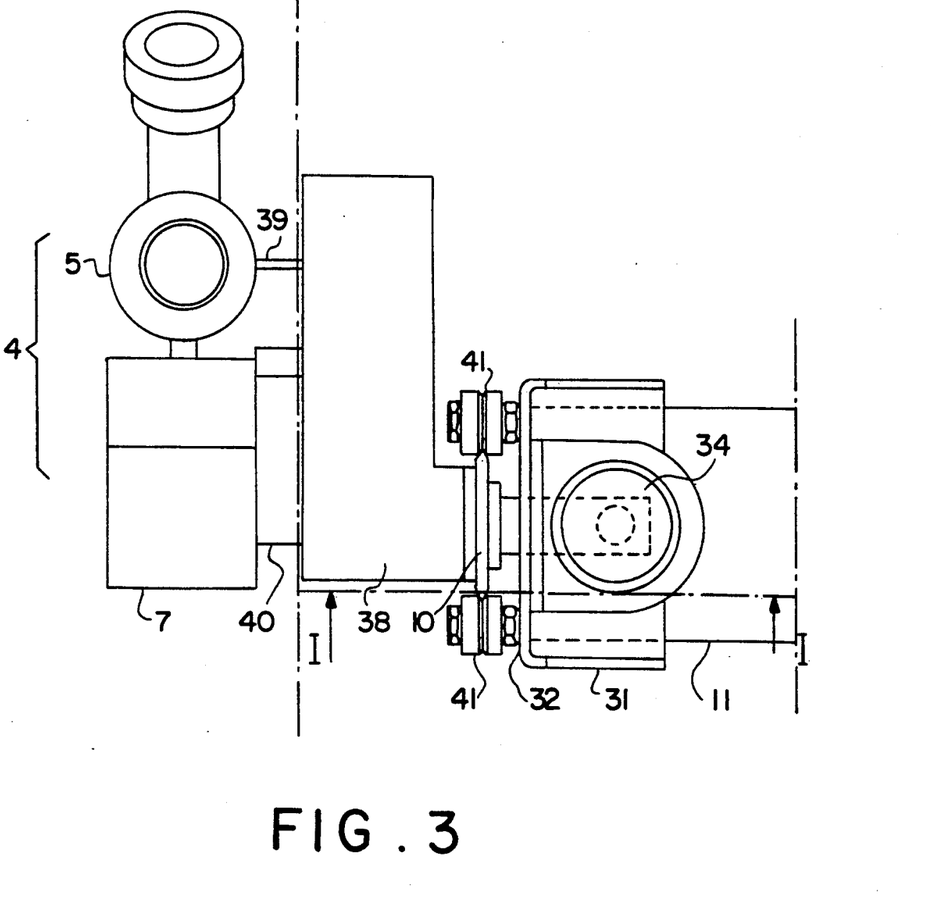
FIG. 3 is a plan view of the means for imparting an ascending and descending movement to the support.
Figure 4:
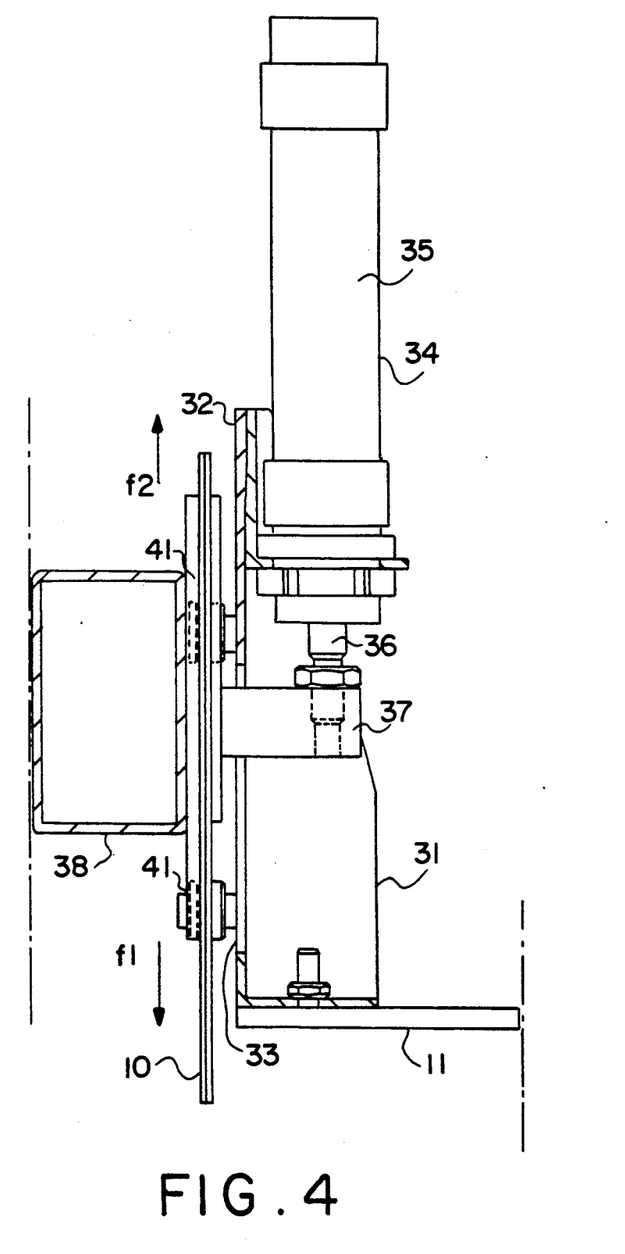
FIG. 4 is a section on the line I—I of FIG. 3.

Referring to FIGS. 3 and 4, the plate 11 carries the bracket 31 of which the vertical face 3 opposite the extrusion assembly has an opening in the form of a rectangular window 33. A lifting and lowering jack 34 comprises a body 35 fixed to the upper part of the bracket 31 and a piston of which the rod 36 is integral with a horizontal flange 37 which passes through the window 33. The runner 10 is vertically fixed on one side to the flange 37 and, on its other side, to the distance block 38. The block 38 in turn carries the extrusion tube 5 and the spray tube 7 respectively fixed to the block 38 by the flange 39 and the plate 40. The runner 10 slides freely between the rollers 41 fixed to the bracket 31. Associated with the piston of the jack 34, magnetic end-of-stroke detectors (not shown) control the interruption in the supply of ice cream to the extrusion tube and in the supply of chocolate in the upper position of the piston and the resumption of supplies in the lower position thereof.

In the embodiment described in the foregoing, in which the descending and ascending movements are sequential, each sequence is controlled by a jack, for example a long-stroke jack responsible for the slow displacement which, at the end of its stroke, actuates a short-stroke jack effecting the rapid displacement. The jack 34 is then replaced by two jacks which act one after the other (not shown in the interests of clarity of the drawings).

Figure 5:
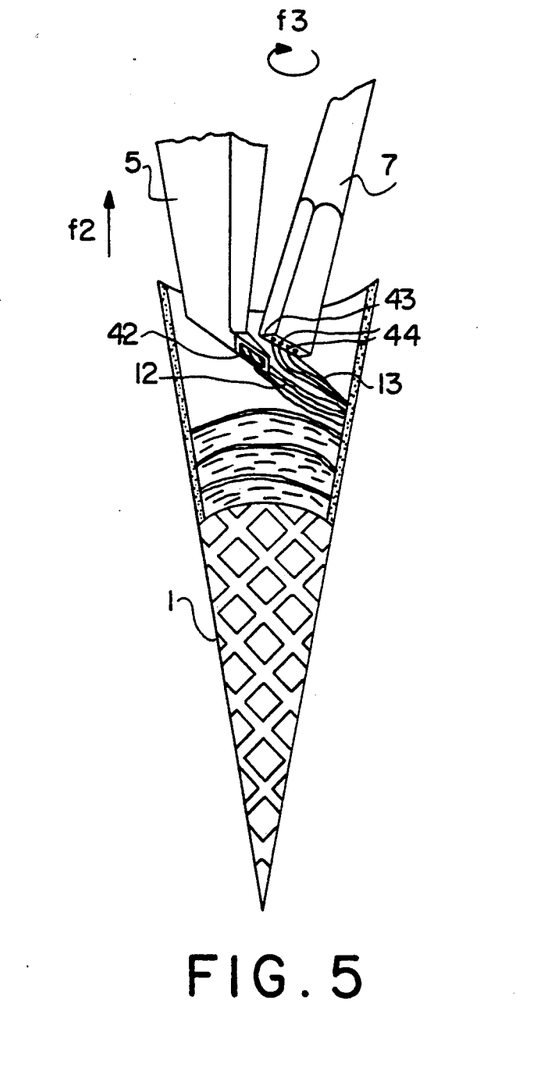
FIG. 5 is a detailed schematic view of the extrusion tubes.

FIG. 5 shows how the successive layers of ice cream 12 and chocolate 13 are formed. By virtue of the fact that the horizontal nozzle 42 of the flat extrusion tube is just below the nozzle 43 which is parallel to the nozzle 42, the thin layers are formed together and the layer, chocolate is cooled on contact with the layer of ice cream, but does not yet become brittle. The orifices 44 in the spray tube are distinctly larger than those of a conventional tube for spraying chocolate, for example 0.5 to 1 mm in diameter, so that the chocolate flows rather than being projected. The orifices 44 are distributed along the nozzle 43 to ensure uniform distribution of the chocolate and the formation of a ribbon. The ice cream is extruded at a temperature of $-5$ to $-3°$ C.

while the chocolate is extruded at a temperature of approximately 32° C. The weight of the chocolate corresponds to approximately 10 to 15% of the weight of the ice cream.

In the detailed description, the extrusion assembly is shown as completely filling only one cornet. It is possible with advantage to couple, for example, two extrusion assemblies situated in line, for example at a distance of five cornets from one another, each assembly effecting half the filling of a cornet. In this case, the rotational drive mechanism can be mounted on a support common to the two extrusion assemblies and may comprise two sets of runners respectively fixed and mobile relative to each extrusion assembly with a common rotational drive shaft situated, for example between the two sets of runners.

Finally, the accompaning drawings show the filling of a single line of cornets. It would of course be possible simultaneously to fill several lines of cornets forming rows without departing from the scope of the invention.

The detailed description was concerned with a mass of ice cream with thin intermediate layers of chocolate. The mass of ice confectionery may consist of an aerated ice composition other than ice cream, for example an aerated sorbet of soft consistency. The ice cream or the sorbet may contain small pieces of preserved fruits, dried fruits and nuts, for example hazel nuts. The pieces of fruit and the sorbets may be flavoured with spirits and liquors.

The crispy composition is hard and brittle. It may consist of a vegetable butter, such as cocoa butter, a cocoa butter substitute or equivalent, a hydrogenated vegetable oil, a vegetable fat fraction or a transesterified fat. It may also be a sweetened aqueous composition, for example a syrup based on cooked sugar and, in that case, would be used in conjunction with a sorbet. A composition of the type in question based on fats or syrup may contain additives, for example colorants and flavourings selected in accordance with the desired contrast with the adjacent layers of soft material. The crispy material must be able to be applied in thin layers. It should be sufficiently thin to break with small crackles when chewed and, in practice, should be less 1 mm thick and, more particularly, less than 0.5 mm thick.

The foregoing description has been concerned with an article in the form of an ice cream cone. The article may also be in the form of an ice lolly of circular crossection and may comprise a holding stick at its centre. In this case, it has to be demoulded again and optionally covered with a coating layer. The article may also be in the form of a tub. In this case, the ice confectionery would be consumed, for example, by means of a spoon, the flaky texture providing the portions with a new taste sensation.

I claim:

1. A process for producing a mass of ice confectionery containing flakes of crispy composition within the mass comprising:

lowering an integral two nozzle assembly into a mould, wherein the assembly has a first nozzle and outlet for extruding an ice confectionery substantially horizontally and has a second nozzle and outlet for distributing a crispy composition wherein the outlet for distributing a crispy composition wherein the outlets are positioned relative to one another for depositing and superposing ice confectionery and crispy composition into the mould and are offset in relation to a central axis of the mould;

rotating the assembly so that it remains in a same orientation in space and imparting an upwardly directed movement to the rotating assembly to provide a spinning movement to the assembly; and extruding ice confectionery from the spinning first nozzle outlet and distributing a crispy composition from the spinning second nozzle outlet into the mould so that the ice confectionery and crispy composition are deposited and superposed one upon another in the mould during the upward spinning movement of the assembly.

2. A process for producing a mass of ice confectionery containing flakes of crispy composition within the mass comprising:

rotating a mould in a horizontal direction;

lowering an integral two nozzle assembly into the rotating mould, wherein the assembly has a first nozzle and outlet for extruding an ice confectionery substantially horizontally and has a second nozzle and outlet for distributing a crispy composition wherein the outlets are positioned relative to one another for depositing and superposing layers of ice confectionery and crispy composition into the mould and are offset in relation to a central axis of the mould; and raising the assembly and extruding ice confectionery from the first rising nozzle outlet and distributing a crispy composition from the second rising nozzle outlet into the rotating mould so that the ice confectionery and crispy composition are deposited and superposed one upon another in the mould.

3. A process for producing a mass of ice confectionery containing flakes of crispy composition within the mass comprising:

rotating an integral two nozzle assembly in a horizontal direction, wherein the assembly has a first nozzle and outlet for extruding an ice confectionery substantially horizontally and has a second nozzle and outlet for distributing a crispy composition wherein the outlets are positioned relative to one another for depositing and superposing ice confectionery and crispy composition one upon another;

raising a mould to the assembly to receive the ice confectionery and crispy composition so that the assembly nozzle outlets are offset in relation to a central axis of the mould; and lowering the mould and extruding ice confectionery from the first nozzle outlet of the rotating assembly and distributing a crispy composition from the second nozzle outlet of the rotating assembly into the lowering mould so that the ice confectionery and crispy composition are deposited and superposed one upon another in the mould.

4. A process for producing a mass of ice confectionery containing flakes of crispy composition within the mass comprising:

raising a mould to an integral two nozzle assembly, wherein the assembly has a first nozzle and outlet for extruding an ice confectionery substantially horizontally and has a second nozzle and outlet for distributing a crispy composition wherein the outlets are positioned relative to one another for depositing and superposing layers of ice confectionery and crispy composition into the mould, so that a central axis of the mould is offset rom the assembly nozzle outlets; and rotating the mould in a horizontal direction, lowering the rotating mould and extruding ice confectionery from the first nozzle outlet and distributing a crispy composition from the second nozzle outlet into the lowering rotating mould so that the ice confectionery and crispy composition are deposited and superposed one upon another in the mould.

5. A process according to claim 1 or 2 or 3 or 4 wherein the mould has a form of a body of revolution.

6. A process according to claim 1 or 2 or 3 or 4 wherein the mould is a cornet wafer coated internally with a fat-based moisture barrier material.

7. A process according to claim 1 wherein the ice confectionery is ice cream and wherein the crispy composition is chocolate.

8. An apparatus for producing a mass of ice confectionery containing flakes of crispy composition within the mass comprising:
a nozzle assembly support;
an integral two nozzle assembly fixed to the support, the assembly having a first nozzle and outlet for extruding an ice confectionery substantially horizontally and having a second nozzle and outlet for distributing a crispy composition wherein the outlets are positioned relative to one another for depositing and superposing extruded ice confectionery and distributed crispy composition one on another;
means for rotating the support horizontally; and
means for imparting vertical movement to the support.

9. An apparatus according to claim 8 further comprising means for imparting an alternating vertical translatory movement to the support.

10. An apparatus according to claim 8 wherein the support comprises a plate which is connected to the rotation means and a bracket connected to the vertical movement means.

11. An apparatus according to claim 10 wherein the rotation means comprise a motor which is connected to a crank to drive the crank which is connected to the plate and two orthogonal sliding runners which are connected to the plate to guide the plate.

12. An apparatus according to claim 10 wherein the vertical movement means comprise a lifting and lowering jack having a body fixed to the bracket and having a piston connected to a sliding runner which is fixed to the assembly.

13. An apparatus according to claim 12 wherein the jack is a long-stroke jack and wherein the vertical movement means further comprises a short-stroke jack connected to the long-stroke jack.

14. An apparatus according to claim 8 further comprising a mould support device positioned beneath the assembly to support a mould beneath the assembly and to rotate the mould in a horizontal direction.

15. An apparatus according to claim 8 further comprising a mould support device positioned beneath the two nozzle assembly to support a mould beneath the assembly and to rotate in a horizontal direction and to further impart a downward vertical movement to the mould.

16. An apparatus for producing a mass of ice confectionery containing flakes of crispy composition within the mass comprising:
a nozzle assembly support;
an integral nozzle assembly fixed to the support, the assembly having a first nozzle and outlet for extruding an ice confectionery substantially horizontally and having a second nozzle and outlet for distributing a crispy composition wherein the outlets are positioned relative to one another for depositing and superposing extruded ice confectionery and distributed crispy composition one upon another;
a mould support device position beneath the assembly;
means for rotating the mould support device horizontally; and
means for vertically displacing the mould support device.

* * * * *

UNITED STATES PATENT AND TRADEMARK OFFICE
CERTIFICATE OF CORRECTION

PATENT NO. : 5,135,767
DATED : August 4, 1992
INVENTOR(S) : Alain DAOUSE

It is certified that error appears in the above-identified patent and that said Letters Patent is hereby corrected as shown below:

Column 3, lines 35-36. "...in a which result..." should be --...which result in a...".

Column 5, line 65 (lines 9-10 of claim 1), after "wherein", delete "the outlet for distributing the crispy composition wherein...".

Column 6, line 67, (line 12 of claim 4), "rom" should be --from--.

Signed and Sealed this

Seventh Day of September, 1993

Attest:

BRUCE LEHMAN

Attesting Officer

Commissioner of Patents and Trademarks